May 11, 1965    J. B. DUKE    3,182,798
PROCESS OF RECOVERING CASSITERITE FROM ORES
Filed March 20, 1962
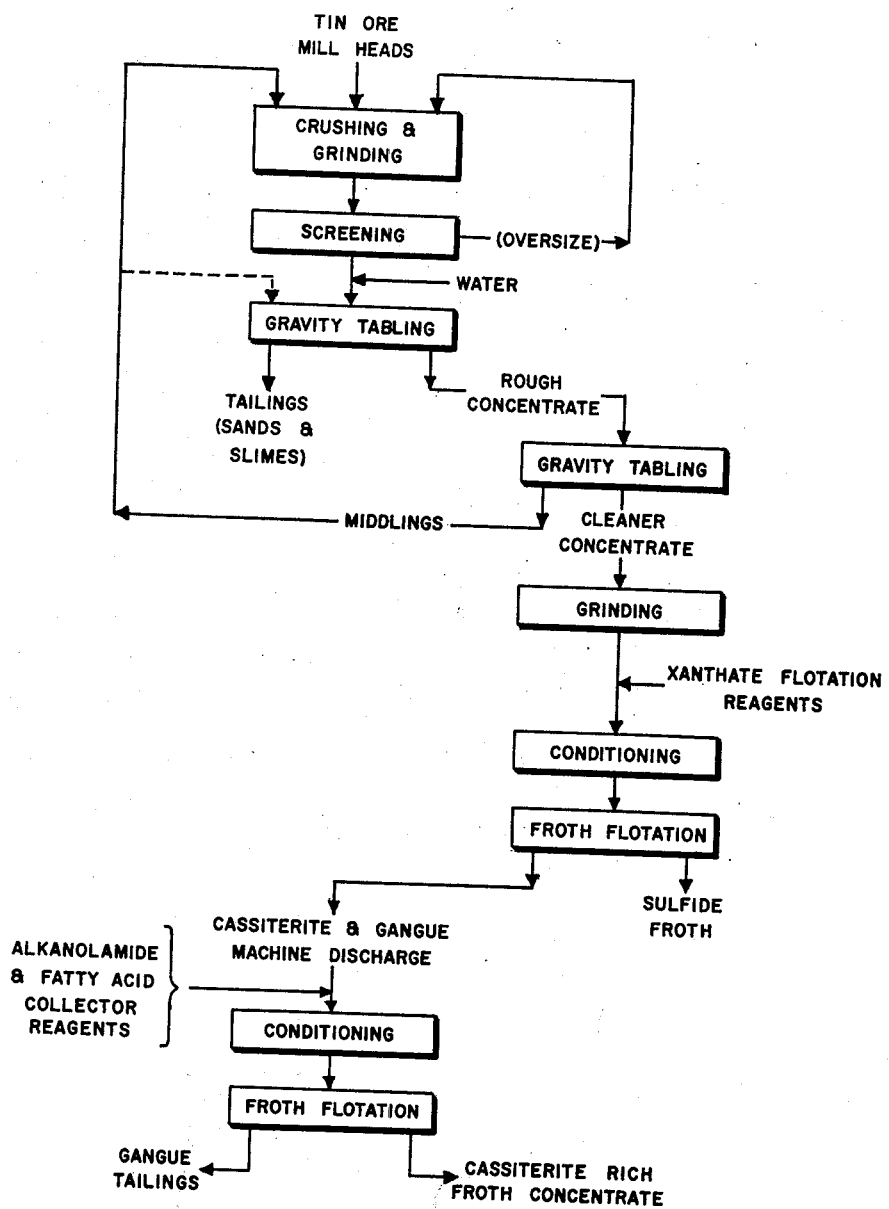
INVENTOR.
JAMES B. DUKE
BY
ATTORNEY

United States Patent Office 3,182,798
Patented May 11, 1965

3,182,798
PROCESS OF RECOVERING CASSITERITE
FROM ORES
James B. Duke, Metuchen, N.J., assignor to Minerals &
Chemicals Philipp Corporation, Menlo Park, N.J., a
corporation of Maryland
Filed Mar. 20, 1962, Ser. No. 181,093
3 Claims. (Cl. 209—166)

This invention relates to a process for recovering cassiterite from ores and relates especially to the concentration of cassiterite ($SnO_2$) from oxidized minerals by froth flotation.

Tin is obtained from ores, such as those found in Bolivia, which contain a great variety of minerals. From a metallurgical point of view the ores consist essentially of quartz, tourmaline, feldspar, mica, iron oxides, a variety of sulfides (of which iron sulfide predominates) and small amounts of cassiterite which constitute the only valuable mineral in the ore. A typical Bolivian ore may contain about ½ to 2% cassiterite, 25 to 40% pyrite, pyrrhotite and marcasite, 20% of siderite, 5 to 20% of quartz, 15 to 20% sericite and 3 to 5% fluorite. At present these ores are concentrated by a gravimetric process, such as the procedure described in an article by O. M. Davila in Engineering and Mining Journal, vol. 158, No. 11, pages 100–108, entitled "How Empresa Minera de Catavi Concentrates Tin Ores." The process involves a heavy media concentration in which the tin ore is crushed, jigged and tabled to produce a cassiterite concentrate which is subjected to froth flotation with a xanthate collector reagent to float sulfides from the cassiterite. By this procedure, a material assaying about 55% Sn is obtained. The recovery of cassiterite is at best only 55 to 60% as a result of losses in the gravimetric concentration steps. Inefficiency inherent in gravity processes and machines plus losses of fine cassiterite in the tailing account for the losses.

Many attempts have been made to float cassiterite and a variety of collector reagents has been suggested, among which may be mentioned certain quaternary ammonium compounds, alkyl cetyl sulfate, oleic acid and sodium oleate. The results, however, have not been sufficiently satisfactory because of the failure to develop reagents of adequate selectivity for the cassiterite. As far as is known, cassiterite is not floated commercially.

After extensive experiments with a wide variety of reagents, a combination of reagents which surprisingly exhibits exceptional selectivity for cassiterite has been discovered. This discovery has led to a simple economical process for recovering from tin ores a high grade cassiterite concentrate at an excellent weight recovery. The process, described hereafter, can obviate the sink float step previously considered necessary in concentrating cassiterite and represents a radical departure from commercial methods for beneficiating tin ores.

Stated briefly, in accordance with this invention, a pulp of cassiterite containing oxidized mineral gangue including silica and silicate minerals (e.g., quartz, tourmaline, limonite, hematite, feldspar, sericite, mica, topaz, fluorite) is conditioned for froth flotation with cooperative collector reagents consisting of a fatty acid and a water-dispersible, nonionic, surface active alkanolamide having the following structural formula:

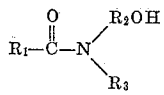

wherein: $R_1$ is selected from the group consisting of n-alkyl and n-alkenyl groups containing from 11 to 17 carbon atoms, $R_2$ is an alkylene group containing from 2 to 3 carbon atoms and $R_3$ is selected from the group consisting of hydrogen and alkanol groups having from 2 to 3 carbon atoms. Mixtures of the aforementioned alkanolamides can also be used. These mixtures are produced when a fatty acid alkanolamide is obtained from fatty acid mixtures, such as coconut fatty acids.

The conditioned pulp is subjected to froth flotation to produce a cassiterite rich froth, leaving gangue minerals in the tailings.

In lode tin ores where, in addition ot oxidized minerals, the tin mineral ore contains sulfide minerals (such as cylindrite, stannite, marmatite, pyrite, marcasite, pyrrhotite, antimonite, bismuthinite, sphalerite, galena, silver sulfides, franckeite and chalcopyrite), the ore, previously tabled if the nature of the ore indicates such pretreatment, is subjected to sulfide flotation with a xanthate collector. The machine discharge product of the sulfide flotation is reagentized with the alkanolamide and fatty acid cooperative reagents and floated to obtain a cassiterite rich concentrate. By this procedure, a 62% weight recovery of a 60% $SnO_2$ (about 47% Sn) grade has been obtained from a Bolivian tin ore assaying only about 1.23% $SnO_2$.

This invention will be more fully understood by the following description, taken in connection with the accompanying drawing which is a flow sheet of a typical plant for concentrating cassiterite from a complex ore containing sulfide, quartz and silicate gangue minerals, in accordance with this invention.

As indicated in the flow sheet, the mill heads are crushed and ground, as to about 20 or 28 mesh, and preferably deslimed to remove primary and secondary slimes. The deslimed material is tabled, as by a Wilfley shaking table, to produce a rougher concentrate (heavies) and a tailing. The rougher concentrate can be retabled to produce a cleaner concentrate and a middling.

The cleaner concentrate is crushed, as to pass a 48 mesh or a 65 mesh screen, and then deslimed. The deslimed feed is subjected to a sulfide flotation, as with the usual xanthate collector reagents. Present results indicate that it may be highly advanageous to incorporate fluoride ion into the pulp before reagentizing the pulp with xanthate and carry out sulfide flotation in an acid circuit. About 1 to 10 pounds of hydrofluoric acid per ton of dry feed can be used. Any of the usual xanthate collectors can be employed as the selective sulfide collector, as examples of which can be mentioned potassium ethyl xanthate, potassium n-butyl xanthate, potassium sec-butyl xanthate, potassium amyl xanthate, potassium n-hexyl xanthate, sodium ethyl xanthate, sodium isopropyl xanthate, sodium sec-butyl xanthate. About ½ to 3 pounds of xanthate collector is used per ton of dry feed. The details of the sulfide flotation step will obviously vary with the nature of the sulfide minerals present in the tin ore and can be readily determined by applying the usual considerations which are familiar to those skilled in the art. The conditioned pulp is aerated in any suitable flotation machine, removing a sulfide float and a tailing which is a concentrate of cassiterite together with oxidized gangue minerals.

The machine discharge product of the sulfide flotation step is deslimed, as by decantation, to remove minus 325 mesh material and conditioned with alkanolamide and fatty acid, preferably lauric acid (or mixed fatty acid consisting predominately of lauric acid). Lauric acid appears to be more suitable than higher fatty acids, such as oleic acid which has been previously employed by others in their efforts to float cassiterite. Alkanolamide is employed in amount of about ½ to 5, and preferably 1 to 2, pounds per ton of dry feed (i.e., dry machine discharge of the sulfide flotation). Fatty acid is employed in amount of about ½ to 5 pounds and preferably about 1 to 2 pounds per ton of the feed. The conditioning agents can be incorporated by stage additions.

The feed to cassiterite flotation, usually after suitable dilution, is conditioned and subjected to froth flotation, withdrawing a froth product which is a concentrate of cassiterite. The froth may be cleaned one or more times to improve the grade. Recovery of cassiterite can be improved by recirculating middlings. The tailings of the cassiterite flotation consist for the most part of quartz and silicate minerals.

Hydrotropic fatty acid alkanolamides employed in carrying out this invention are described in Schwartz-Perry's "Surface Active Agents," pages 212–213 (1949), and are produced by mixing 1 mol of fatty acid with 1 to 2 mols of alkanolamine and condensing the mixture at a temperature below the decomposition temperature of the resulting hydrotropic material. Diethanolamine is most frequently used in the process but other alkanolamines, such as monoethanolamine and isopropanolamine, can be used, as can mixtures of any of the aforementioned alkanolamines. The fatty acids commercially used in producing these amides are derived from naturally occurring animal and vegetable oils and fats which are sometimes hydrogenated. As examples of suitable fatty acids can be mentioned stearic acid, oleic acid, palmitic acid, linoleic acid, lauric acid, myristic acid and coconut fatty acids. The coconut fatty acids are employed most frequently.

Some species of hydrotropic fatty acid alkanolamides are coconut fatty acid diethanolamide, lauric acid diethanolamide, stearic acid monoethanolamide and oleic acid diethanolamide.

Present experience indicates the nonionic alkanolamide employed in carrying out this invention cooperates with the fatty acid reagent to enhance the selectivity of the fatty acid reagent for the cassiterite. Exceptional concentration can be obtained with the combined reagents, but not with the individual reagents.

While this invention has been disclosed with reference to its utility in concentrating the mineral cassiterite from deslimed flotation feed, it will be understood that it is also fully within the scope of this invention to employ the selective cassiterite cooperative collector reagents (fatty acid and alkanolamide) in concentrating cassiterite in slimed pulps by the flotation procedure described in U.S. 2,990,958.

The following example illustrates the concentration of cassiterite from the ore operations of Empresa Minera de Catavi in Bolivia. The ore assayed 1.23% Sn, principally as cassiterite, representing 1.56% SnO$_2$. The ore also contained cylindrite Pb$_6$Sb$_2$SnS$_{11}$, stannite (Cu$_2$SFeSSnS$_2$), pyrite, marcasite, pyrrhotite, antimonite, bismuthinite, sphalerite, galena, silver sulfides, franckeite, chalcopyrite, quartz, tourmaline, limonite, hematite, feldspar, sericite, mica, topaz and fluorite.

TABLING

The mill heads were crushed to pass a 20 mesh screen and the minus 20 mesh ore was placed on a Wilfley shaking table, producing a rougher concentrate (heavies) and a tailing. The rougher concentrate was retabled, producing a cleaner concentrate (heavies) and a middling. Following are the metallurgical results which show that the cassiterite grade of the mill heads was increased from 1.57% to 8.29% with a 77.4% recovery of the cassiterite.

*Tabling metallurgical results*

| Products | Percent Wt. | Percent Sn | Percent Sn Distribution | Percent Cassiterite (SnO$_2$) |
|---|---|---|---|---|
| Heads | 100 | [1] 1.24 / [2] (1.23) | 100.0 | 1.57 |
| Table cl. conc. | 14.7 | [2] 6.53 | 77.4 | 8.29 |
| Table mids | 37.7 | [2] 0.27 | 8.1 | 0.34 |
| Table tails | 47.6 | [2] 0.37 | 14.5 | 0.47 |
| Table tails +325 mesh | 29.2 | [1] 0.24 / [2] (0.17) | 5.6 | 0.30 |
| Table tails −325 mesh | 18.4 | [2] 0.61 | 8.9 | 0.77 |

[1] Calculated.
[2] Assayed.

SULFIDE FLOAT

The minus 20 mesh table concentrate containing 8.29% cassiterite, representing 77.4% by weight of the cassiterite in the mill heads, was crushed to pass a 65 mesh screen. After settling, water was decanted from the crushed ore and the minus 65 mesh feed was put into a 100 gm. Minerals Separation Sub A flotation machine, diluted to about 10% solids with water acidified with sulfuric acid to a pH of 3. The pulp was conditioned for 3 minutes with the following reagents.

Reagent: Quantity, #/ton dry feed
- Hydrofluoric acid — 10.0
- Sulfuric acid — 5.0
- Potassium sec-amyl xanthate — 2.0
- Pine oil — 0.36

The pulp was aerated and a froth product removed for 2 minutes, removing a sulfide froth product. The residue in the flotation machine was conditioned for 1 minute with 1 pound per ton of sec-amyl xanthate and a second froth product withdrawn for 1 minute. The sulfide machine discharge was deslimed by decantation and pulped back into the flotation machine.

CASSITERITE FLOAT

The deslimed sulfide machine discharge product was conditioned for 2 minutes with the following reagents.

Reagent: Reagent quantity, #/ton dry feed
- Coconut fatty acid diethanolamide (Monamid 150 CE)[1] — 2.0
- Lauric acid (Neofat 265) — 4.5

[1] An amide having the following specifications:
- Percent condensate (approx.) — percent 86
- Uncondensed fatty acid (as lauric) — do 3.5
- Alkali No. (mgr. KOH/gm.) — 40–50

The conditioned pulp was aerated and subjected to a rougher flotation, withdrawing a cassiterite rich froth for 1 minute. The residue in the flotation machine was conditioned with the same reagents (alkanolamide and fatty acid), employing the same reagent quantities and conditioning time as in the first stage reagent addition. The reagentized pulp was frothed for 2 minutes. The residue in the machine was again conditioned for 2 minutes with 1.0 pound per ton of the alkanolamide and 4.5 pounds of the lauric acid and frothed for 1 minute. The three cassiterite froths were combined and, without further addition of reagents, subjected to a cleaner flotation treatment.

Following are the metallurgical results of the sulfide and cassiterite flotation operations and of the combined tabling and flotation operations.

FLOTATION METALLURGICAL RESULTS

| Products | Percent Wt. | Percent Sn | Percent Sn Distribution | Percent Cassiterite (SnO$_2$) |
|---|---|---|---|---|
| Feed | 100.0 | 6.53 | 100.0 | 8.29 |
| Sulfide FP | 18.9 | | | |
| Sulfide M.D. slime | 3.7 | | | |
| Tin conc | 11.1 | 47.26 | 80.4 | 60.00 |
| Tin mid | 5.0 | | | |
| Tin tail | 61.3 | | | |

TABLING AND FLOTATION METALLURGICAL RESULTS

| Products | Percent Wt. | Percent Sn | Percent Sn Distribution | Percent Cassiterite (SnO$_2$) |
|---|---|---|---|---|
| Feed | 100.0 | 1.23 | 100.0 | 1.56 |
| Tin flot. conc | 1.6 | 47.26 | 61.8 | 60.00 |
| Tin flot. waste | 13.1 | 2.21 | 23.7 | 2.81 |
| Table mid. and tail | 85.3 | 0.21 | 14.5 | 0.27 |
| Total Waste | 98.4 | 0.48 | 38.2 | 0.61 |

The results for the flotation operation show that 80.4% of the tin values in the table concentrate were recovered in the form of a concentrate of 60.00% cassiterite grade. These results indicate that the collector reagents employed in both th sulfide and cassiterite flotations were highly selective. Results for combined tabling and flotation indicate that the overall recovery of cassiterite from the mill heads was 61.8%, a result which compares very favorably with the best results obtained with the Catavi ore by commercial gravimetric concentration followed by sulfide flotation.

I claim:

1. The process for recovering cassiterite from an aqueous ore pulp including cassiterite and silica and silicate gangue minerals which comprises subjecting said aqueous pulp to froth flotation in an acid circuit in the presence of lauric acid and a non-ionic water-dispersible alkanolamide as cooperative collector reagents thereby producing a froth product which is a concentrate of cassiterite and a tailing composed largely of gangue including said silica and silicate minerals, said alkanolamide having the following structural formula:

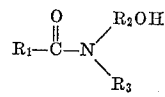

wherein: $R_1$ is selected from the group consisting of n-alkyl and n-alkenyl groups containing from 11 to 17 carbon atoms, $R_2$ is an alkylene group having from 2 to 3 carbon atoms, and $R_3$ is selected from the group consisting of hydrogen and alkanol groups having from 2 to 3 carbon atoms.

2. The method of claim 1 wherein said alkanolamide is obtained from coconut fatty acids.

3. The method of claim 2 wherein said ore has previously been treated by flotation to remove sulfides.

References Cited by the Examiner
UNITED STATES PATENTS 2,173,909    9/39    Kritchevsky  ---------- 209—166
2,192,664    5/40    Kritchevsky  ---------- 209—166

FOREIGN PATENTS 340,598    1/31    Great Britain.
115,280    5/41    Australia.

OTHER REFERENCES

Davila Engineering and Mining Journal, volume 158, Number 11, pages 100–108, November 1957.

GEORGE D. MITCHELL, *Primary Examiner.*

HERBERT MARTIN, EDWARD MICHAEL, *Examiners.*